United States Patent [19]

Harrington

[11] 4,045,619
[45] Aug. 30, 1977

[54] TELEPHONE CONTROL SYSTEM
[75] Inventor: Laurence P. Harrington, Arlington, Mass.
[73] Assignee: Aristonics Corporation, Woburn, Mass.
[21] Appl. No.: 622,006
[22] Filed: Oct. 14, 1975

Related U.S. Application Data

[63] Continuation-in-part of Ser. No. 558,962, March 17, 1975, abandoned.

[51] Int. Cl.² .................................. H04M 1/66
[52] U.S. Cl. ..................... 179/18 DA; 179/7.1 R; 179/81 R
[58] Field of Search .......... 179/2 CA, 7.1 R, 7.1 TP, 179/18 BA, 18 D, 18 DA, 84 R, 84 C, 90 D, 6.3 CC, 90 CS, 41 A; 235/61.7 B, 61.11 E

[56] References Cited

U.S. PATENT DOCUMENTS

| | | | |
|---|---|---|---|
| 3,555,198 | 1/1971 | Stepan et al. | 179/18 D |
| 3,573,389 | 4/1971 | Greenstein et al. | 179/18 BA |
| 3,581,019 | 5/1971 | Ryan | 179/90 CS |
| 3,624,608 | 11/1971 | Altman | 235/61.7 B |
| 3,665,162 | 5/1972 | Yamamoto et al. | 179/2 CA |
| 3,801,745 | 4/1974 | Zuckerman | 179/7.1 R |
| 3,806,652 | 4/1974 | Woolf et al. | 179/7.1 R |
| 3,873,781 | 3/1975 | Nissim | 179/18 B |
| 3,931,476 | 1/1976 | Matthews | 179/18 DA |
| 3,934,095 | 1/1976 | Matthews et al. | 179/18 DA |

Primary Examiner—Kathleen H. Claffy
Assistant Examiner—Gerald L. Brigance
Attorney, Agent, or Firm—Cesari & McKenna

[57] ABSTRACT

Apparatus for controlling telephone set usage in a local telephone facility. Each potential telephone user has a card which identifies him and contains an authorization code. Prior to dialing, the user inserts the card into an accessory body which contains a reading mechanism. If the user dials an unauthorized call, the telephone set is disconnected from an outgoing telephone line. Other circuits collect and store detailed data relating to each authorized call. When the user completes a call, the data is transferred to a memory or other output device.

29 Claims, 16 Drawing Figures

TELEPHONE CONTROL SYSTEM

CROSS REFERENCE TO RELATED APPLICATION

This application is a continuation-in-part of my copending application Ser. No. 558,962, now abandoned, filed Mar. 17, 1975 and assigned to the assignee hereof.

BACKGROUND OF THE INVENTION

This invention relates generally to telephone systems and more particularly, to an improved telephone control system which restricts telephone usage within the subscriber-determined levels and collects detailed data concerning permitted calls.

Charges for telephone service for a business subscriber usually are based upon a monthly basic service charge plus toll charges. The toll charges, in turn, include long distance charges and, in many areas, message unit charges for local calls. As overall charges increase, either because the subscriber uses the telephone more or because the toll rates increase, it becomes desirable for management in the business to more closely control telephone use. It is the purpose of such control to allocate telephone expenses, to minimize telephone use for non-business purposes, or to minimize telephone use by unauthorized personnel.

A typical business telephone facility includes an on-premise telephone exchange terminal, such as PBX or PABX equipment. Each telephone set is connected to the exchange terminal by a telephone line. An outgoing or incoming call can be extended when the exchange terminal connects a telephone line to a trunk line running to and from a telephone company central office.

There are available various telephone monitoring systems which have been designed to provide a subscriber with greater control over telephone set usage. For example, one prior system collects and stores data concerning the number dialed, the telephone set used, the elasped time and the time and date of each call made through the subscriber's facility. The system requires that a user, after dialing a desired number, dial a personal identification number, which is also stored. Once the user dials his personal identification number, use of the telephone set is unrestricted. Thus, this system does not prevent a user from placing calls beyond certain levels.

In another prior system, the telephone sets in a subscriber's facility are maintained in a normally disabled state. A potential user is required to dial a telephone set identification number before the set can be connected to an outgoing trunk line. The system operates to store the telephone set identification number and to collect and store data concerning the number dialed, the elasped time and the time and date of each call. This system, however, like the above mentioned system, does not control the types of calls made by a user. Additionally, this system does not provide the subscriber with the option of supplying different users with different call authorization levels.

It is, therefore, an object of the present invention to provide an improved telephone control system.

A further object of the invention is to provide an improved telephone control system which controls the types of calls made by each user.

Another object of the invention is to provide a telephone control system of the type described in which use of a telephone set in a subscriber's facility by any person is restricted to certain subscriber-determined levels for that person.

Still another object of the invention is to provide a telephone control system of the type described which employs a user identification card and which, in response to reading the card, detects the individual user's call authorization level, and restricts use of a telephone set according to the user's level.

Still another object of the invention is to provide a telephone control system of the type described which collects and stores detailed data concerning each user and each permitted call.

SUMMARY OF THE INVENTION

The present invention is directed to a telephone control system which operates in accordance with the call authorization level of each potential telephone set user. Each telephone set to be controlled in a subscriber's facility is arranged to detect the user's call authorization level. The telephone set remains connected as usual to its telephone line if use thereof is consistent with the particular user's level. If the user attempts to exceed his level, the telephone set is disconnected from its telephone line, and the attempted call is blocked.

Illustratively, each potential telephone set user is assigned a user identification device such as a card. The card is encoded with the user's authorization level. Each telephone set to be controlled is equipped with an accessory body containing a card reader. Calls are allowed or disallowed based upon the user authorization level data read from the card. Additional circuits in the system collect and store detailed data concerning each authorized call. The data collected can include the user's identification number and authorization level, the identification number of the telephone set used, the number dialed, the time and date of the call, and the elapsed time of the call.

The invention is pointed out with particularity in the appended claims. The foregoing and other features and advantages of the invention will be better understood from the following detailed description taken in conjunction with the accompanying drawings.

DETAILED DESCRIPTION OF ILLUSTRATIVE EMBODIMENTS

The Accessory Body

Figure 1:
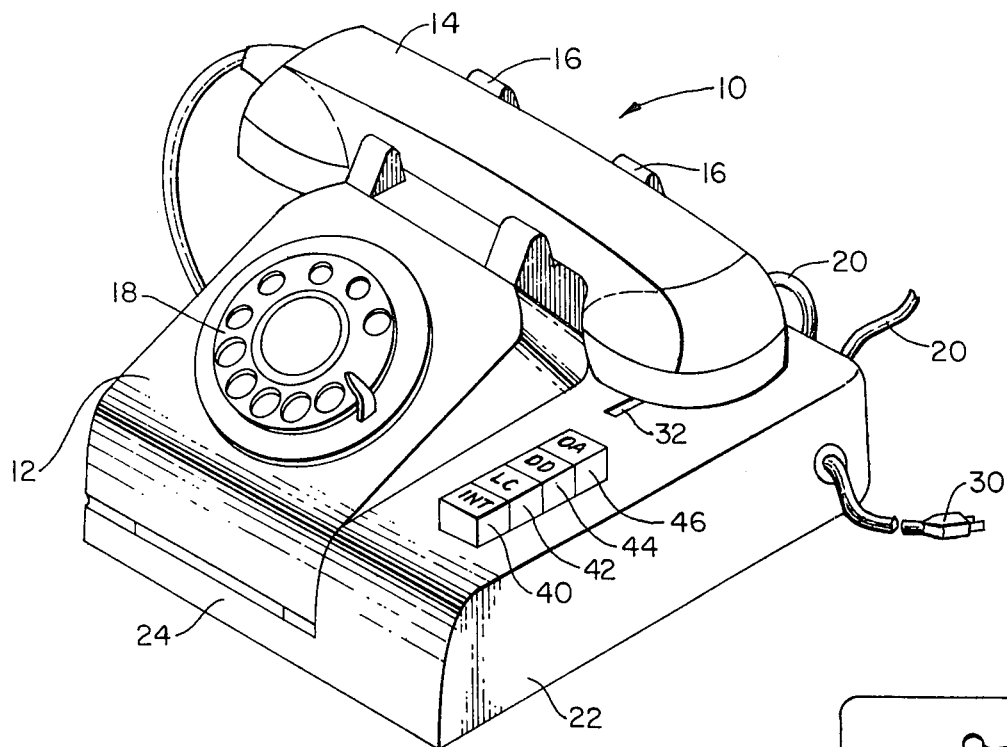
FIG. 1 is a perspective view of one embodiment of an accessory body of the invention shaped for detachably supporting thereon a telephone set to be controlled.

In FIG. 1, a telephone set 10 is illustratively one set in a local subscriber telephone facility including a plurality of similar sets. The telephone set 10 includes a base 12, a receiver 14, a cradle 16 for holding the receiver 14, and a dialing unit 18. A telephone line 20 carries call signals to and from the set 14. The line 20 typically connects the set 14 to an on-premise telephone exchange terminal (not shown), such as a PBX or PABX.

Figure 2:
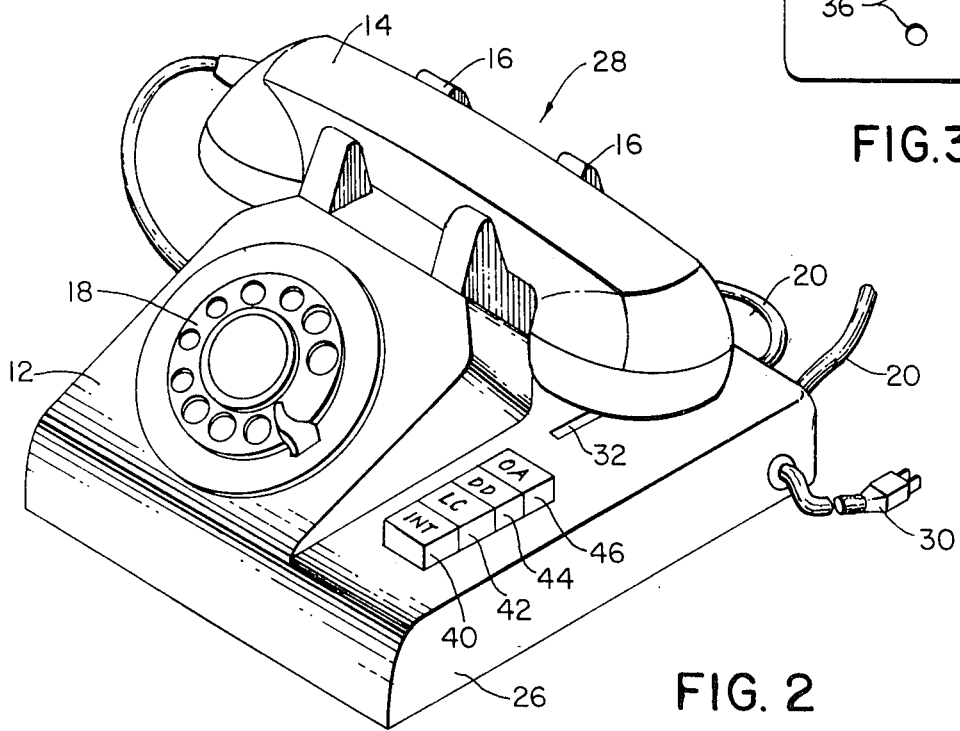
FIG. 2 is a perspective view of another embodiment of an accessory body of the invention formed as a structurally integral part of the telephone set it controls.

An accessory body 22 houses various of the components in the telephone control system of the invention. As shown in FIG. 1, the accessory body 22 includes a laterally extending, flat portion 24 with dimensions approximately equal to those of the underside of the base 12, so that the portion 24 supports the telephone set 10. Such an arrangement allows the telephone set to be easily detached from the accessory body 22 in the event that service to either the set or to the components within the accessory body is required. The arrangement may, of course, be varied, and the accessory body 22 may be shaped differently than shown in FIG. 1, and used entirely separate from the telephone set 10. Also, as illustrated in FIG. 2, an accessory body 26 may be built as a structurally integral part of a telephone set 28. The set 28 is otherwise similar to the set 10, with similar elements referenced by similar numerals.

Each of the accessory bodies 22 and 26 in FIGS. 1 and 2 includes a plug 30 extending therefrom which may be inserted in any standard 110 volt a.c. wall receptacle to provide power to the components housed therein. As indicated in FIGS. 1 and 2, the telephone line 20 is fed into the accessory bodies 22 and 26 and from there to the telephone sets 10 and 28. Moreover, each accessory body 22 and 24 has a slot 32 dimensioned to receive a user identification device therein.

Figure 3:
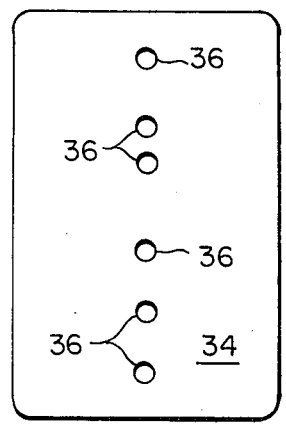
FIG. 3 illustrates a user identification device in the form of an encoded card for use with the accessory bodies of FIGS. 1 and 2.

One desirable form of a user identification device is shown in FIG. 3 in the form of an encoded card 34. The card 34 may conveniently be of the size and shape of a conventional credit card. It illustratively includes a plurality of selectively located light transmitting openings 36 in an otherwise opaque setting. The absence or presence of these openings 36 in selected locations of the card 34 is used to represent, in binary format, an identification number for the particular user to whom the card 34 is assigned, as well as the user's call authorization level. One of the components housed in the accessory bodies 22 and 26 is thus a card reading means, to be described in detail below, which optically reads the information encoded on the card 34 when the card is properly inserted in the slot 32.

It will be noted from FIGS. 1 and 2 that the slot 32 in the accessory body 22 and 26 is positioned directly below the receiver 14. Consequently, the receiver 14 must be removed from its cradle 16 before the card 34 can be inserted in the slot 32. The card 34 may also be dimensioned so that, when inserted in the slot 32, it projects outwardly therefrom through a distance sufficient to interfere with the placing of the receiver 14 on its cradle 16. The receiver can thus not be properly placed on its cradle until the card 34 is removed from the slot 32. This arrangement conveniently provides the user with a reminder that a card must be inserted in the slot 32 before a call can be made and removed upon completion of a call.

Four externally mounted, manually depressible keys 40, 42, 44, and 46 are incorporated within the accessory bodies 22 and 26. These keys are used in conjunction with an optional call enabling unit which allows the subscriber to select the levels of calls for which a card will be required. This optional call enabling unit is described in detail in a later section.

The System

Figure 4:
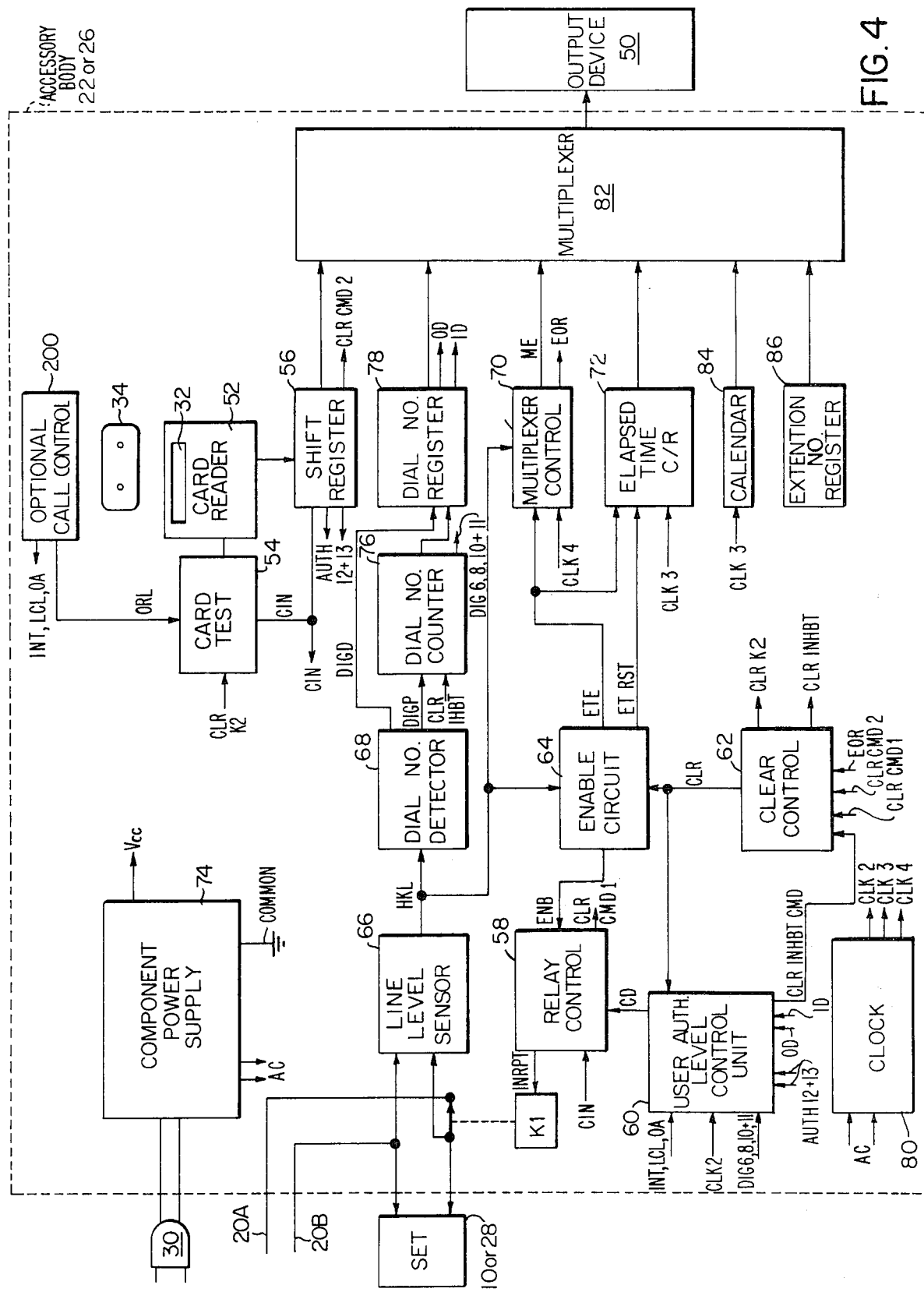
FIG. 4 is a block diagram of circuits in a telephone control system embodying the invention.

Referring now to FIG. 4 of the drawing, the circuit components in a telephone control system embodied in accordance with the invention are shown. The various components in the system are preferrably of an integrated circuit format so that they are relatively compact and small in size. All components with the exception of the telephone set 10 or 28, the plug 30, and the output device 50 may thus be housed entirely within the accessory body 22 or 26, as indicated in FIG. 4.

In normal operation, a user wishing to place a call within his authority through the telephone set 10 or 28 shown in FIGS. 1 and 2 first removes the receiver 14 from its cradle 16 and inserts the card 34 in the slot 32. As indicated in FIG. 4, the card 34 is then in position to be read by a card reader 52. If the card 34 is properly inserted in the card reader 52, a card test unit 54 generates a card-in (CIN) signal. This CIN signal is applied to a shift register 56 and a relay control unit 58. The CIN signal to the shift register 56 causes the user identification and authorization level data encoded on the card 34 to be transferred to and stored in the shift register 56. User authorization level signals (AUTH -12 and -13) are sent from corresponding stages in the shift register 56 to a user authorization control unit 60, which, in a manner to be described in more detail below, controls the use of the telephone set by the user.

After the user identification and authorization level data is properly loaded into the shift register 56, a clear command signal (CLR CMD 2) from the shift register 56 causes a clear control unit 62 to transmit a clear signal (CLR) to both an enabling circuit 64 and the user authorization control unit 60. The CLR signal conditions the circuit 64 and the unit 60 for controlling the call to be dialed by the user.

The fact that the receiver 14 is off of its cradle 16 (FIG. 1) is sensed by a line level sensor 66. As shown in FIG. 4, the line level sensor 66 is connected across leads 20A and 20B in the telephone line 20 connected to the telephone set 10 or 28. In present telephone systems, when the receiver is removed from its cradle, the voltage between the telephone leads 20A and 20B goes from 48 volts to 0 volts. The line level sensor 66 is arranged to sense the voltage change when the receiver is lifted and to transmit a corresponding HKL signal. The combination of the HKL signal and the CLR signal in the enabling circuit 64 causes it to transmit an enable signal (ENBL) to the relay control unit 58. The enabling circuit 64 also transmits an elapsed time enabling signal (ETE) both to a multiplexer control unit 70 and to an elapsed time counter/register 72. The ETE signal clears the multiplexer control unit 70, and enables the elapsed time counter/register 72.

At this point it should be noted that the card test unit 54 does not generate the CIN signal if the card 34 is not inserted. Thus, if the user dials without inserting the card 34 into the card reader 52, the relay control unit 58 transmits an interrupt signal (INRPT) to relay K1. As shown in FIG. 4, the relay K1 is a normally closed relay and is connected so as to interrupt the lead 20A to the telephone set 10 or 28. The INRPT signal causes the relay K1 to open, thus preventing a call from being extended through the set 10 or 28. If the user then properly inserts the card 34 in the card reader 52, the CIN signal will be generated and the INRPT signal from the relay control unit 58 will teminate. This will cause the relay K1 to close and allow the user to dial the call.

It is also noted that if power to the component power supply 74 through the plug 30 should, for some reason, be terminated, the normally closed relay K1 leaves the telephone set 10 or 28 connected as usual. Consequently, in the event of a power or component failure, the telephone control system of the invention is such that the telephone sets in the subscriber's facility remain enabled. As a result, a user may attempt to temporarily disable the system at a particular telephone set by disconnecting the plug 30. Action of this type by a user would not go undetected for very long in view of the detailed data that is collected by the system for each call. Nevertheless, it may be desirable to use a suitable mechanical device for retaining the plug 30 in its wall receptacle. Alternatively, the power lines may be permanently wired to each accessory body 22 and 26, thus eliminating the plug 30 altogether. Additionally, a normally open relay may be used as K1 in place of the normally closed relay so that the telephone set 10 or 28 is normally disconnected from the telephone line 20. The normally open relay would in such a case be closed in response to the CIN signal (card 34 inserted) to enable the telephone set to be used to dial or answer a call.

After the user properly inserts the card 34 in the card reader 52, he dials a telephone number comprising the desired sequence of digits using the dialing unit 18 (FIGS. 1 and 2). Dial pulses are generated on the leads 20A and 20B which, in present telephone systems, are between 0 and 48 volts. The number of pulses is equal to the value of the digit dialed with the exception of 0, which produces 10 pulses. As known, the dial pulses are of 60 millisecond duration. Consecutive pulses in a single dialed digit are spaced in time by 40 milliseconds. The time separation between consecutively dialed digits is many times longer than this.

The line level sensor 66 couples the dial pulses from the leads 20A and 20B to the dialed number detector 68. The dialed number detector 68 is arranged to transmit two signals in response to dialing by the user. A first signal (DIGP), constituting one pulse for each decimal digit dialed by the user, is transmitted to a dialed number counter 76. A second signal (DIGD), constituting a number of pulses corresponding to the value of each digit dialed, is transmitted to a dialed number register 78. In this way, both the number of digits dialed by the user and the specific digits dialed are detected by the system.

The dialed number counter 76 is arranged to transmit DIG6, DIG8, DIG10, and DIG11 pulses upon the dialing of the sixth, eighth, tenth, and eleven digits, respectively. The DIG6, DIG8, DIG10, and DIG11 pulses are applied as inputs to the user authorization control unit 60. The dialed number register 78 is arranged to transmit a signal (OD) in the event that a 0 (zero) or Operator digit, is dialed as the first digit in the call, and also to transmit a signal (1D) in the event that a 1 is dialed as the first digit. The OD signal and 1D signals are also applied as inputs to the user authorization level control unit 60.

The AUTH-12 and -13 signals from the shift register 56 provide the user authorization level control unit 60 with an indication of the particular user's call authorization level. For example, in a first level, the user may be authorized to make intercom calls only. In this level, calls of more than six digits are not allowed. In second level, the user may be authorized to make local calls of not more than seven digits. Finally, in a third level, the user may be authorized to make long distance calls of 10 or 11 digits. The AUTH-12 and -13 signals are illustratively binary coded according to the following table:

| Call Level | AUTH-12 | AUTH-13 |
|---|---|---|
| intercom only | 0 | 1 |
| local and intercom | 1 | 0 |
| long distance, local and intercom | 1 | 1 |

In its normal operating mode, the user authorization level control unit 60 in FIG. 4 will not permit operator-assisted calls to be extended through the set 10 or 28 (FIGS. 1 and 2). This feature of the system is desirable for those applications in which cost reduction is the primary concern, because operator-assisted calls, as compared to direct-dialed calls, are more expensive. Operator-assisted calls are allowed by incorporating into the system the optional call unit 200 which is described later herein.

If the user exceeds his subscriber determined authorization level by dialing more digits than permitted, or by dialing a 0 as the first digit in the call, the user authorization level control unit 60 sends a call disabling signal (CD) to the relay control unit 58. The CD signal, which illustratively has a duration of 2 seconds, in turn causes the relay control unit 58 to again send an INRPT signal to the relay K1. The relay K1 is thus opened for 2 seconds, and the attempted call interrupted.

The relay control unit 58 also sends a clear command signal (CLR CMD 1) to the control unit 62. The unit 62 in turn sends a CLR signal to reset the enabling circuit 64 and the user authorization level control unit 60 thereby enabling the system to test a subsequently dialed number. The user is consequently required to dial again.

As long as the user continues to exceed his authorization level or to dial a leading 0, his call will be interrupted. However, if the call dialed by the user is authorized, the CD signal is not sent by the user authorization level control unit 60. The enabling circuit 64 in this event transmits an elapsed time reset signal (ET RST) which resets the elapsed time counter register 72 causing to to commence counting elapsed time of the call. CLK 3 pulses, i.e., 4 pulses per minute, from a clocking unit 80 are counted from this point on within the elapsed time counter/register 72. Elapsed time is thus counted as the number of 15 second time intervals in the call.

The CLK pulses from the clocking unit 80 are derived from a 60 Hz AC line supplied by the component power supply 74 through the wall plug 30. The 60 Hz signal is fed through conventional pulse rate reduction circuits within the clocking unit 80 to produce the CLK 2, 3 and 4 signals, respectively.

When an authorized call is terminated, the user removes the card 34 from the slot 32 and returns the receiver 14 (FIG. 1) to its cradle. The CIN signal is terminated by the card test unit 54, and the HKL signal is terminated by the line level sensor 66. The mutiplexer control unit 70 is arranged so that it is enabled 120 milliseconds after the termination of the HKL signal. CLK 4 pulses, i.e., 2 pulses per second, from the clocking unit 80 sequentially enable the multiplexer control unit 70 causing it to transmit multiplexer enable signals (ME) to a data multiplexer 82. The multiplexer 82 thus couples to the output device 50, in sequence, signals corresponding to the contents of the shift register 56, the dialed number register 78 and the elapsed time counter/register 72. The device 50 may be a memory for storing and accumulating the data, a data printer for providing data readout in printed form, or any other suitable output device.

A calendar 84 and a telephone set extension number register 86 are also illustratively included in the system, and supply additional call data. The calendar 84 includes a data register and conventional pulse rate reduction circuits which reduce the CLK 3 pulses from the clocking unit 80 to tabulate continuously time of day (four decimal digits) and day of year (three decimal digits e.g., 1 to 365). The calendar 84 is read each time a call is allowed by the user authorization control unit 60, and the call time and date data is stored in the calendar register. A manual set device may be included to allow setting of the calendar and updating after a power failure. As indicated, the calendar is connected directly to the multiplexer 82 so that the call time and date data collected therein is read out to the device 50 through the multiplexer 82.

Similarly, the extension number register 86 connects directly to the multiplexer 82 so that data with respect to the particular telephone set being used may also be collected. The extension number register 86 illustratively comprises sixteen two position switches which encode, in binary coded decimal format, four decimal digits of a telephone set identification number.

Thus, upon termination of each permitted call, data with respect to the user's identification number and authorization level contained in shift register 56, the dialed number in the dialed number register 78, the duration of the call from data in the elapsed time counter/register 72, the time and date of the call stored in the calendar 84, and the telephone set extension number from the extension number register 86 are transferred to the device 50. Upon completion of the data transfer, the multiplexer control unit 70 transmits an EOR signal to the clear control unit 62. The EOR signal, like the CLR CMD signals, causes the unit 62 to transmit a CLR signal to reset the enabling circuit 64. The enabling circuit 64 again transmits an ETE signal to clear the multiplexer control unit 70 and the elapsed time counter/register 72. The clear control unit 62 also transmits a clear inhibit signal (CLR INHBT) and a clear card test signal (CLR K2). The CLR INHBT signal clears the dialed number counter 76 and the dialed number register 78. The CLR K2 signal terminates the CIN signal from the card test unit 54 even though the user may have left the card 34 in the slot 32. The system is thus restored to its initial state, and is in condition for controlling and identifying subsequent calls.

When the PBX or PABX in the subscriber's facility receives an incoming call, it forwards the call to a telephone set. The set rings as usual to indicate the presence of the incoming call. When the user lifts the receiver 14 (FIG. 1) to answer the call, he must insert the card 34 into the card reader 52. Otherwise the card test unit 54 will not generate the CIN signal and the relay control unit 58 will open the relay K1. Extension of the call to the telephone set would thus be prevented.

If the user inserts the card 34, the relay K1 closes. The incoming call can then be answered. The system operates as described above in connection with outgoing calls to collect all user and incoming call data with the exception of number dialed. Upon completion of the incoming call, the user and incoming call data is transferred through the multiplexer 82 to the output device 50. Upon completion of the incoming call data transfer, the system is, in the manner described above, restore to its initial, call controlling condition.

Specific System Components

FIGS. 5 through 13 of the drawing show specific illustrative details of the circuit components shown in FIG. 4.

Card Reader 52, Shift Register 56 and Card Test Unit 54

Figure 5:
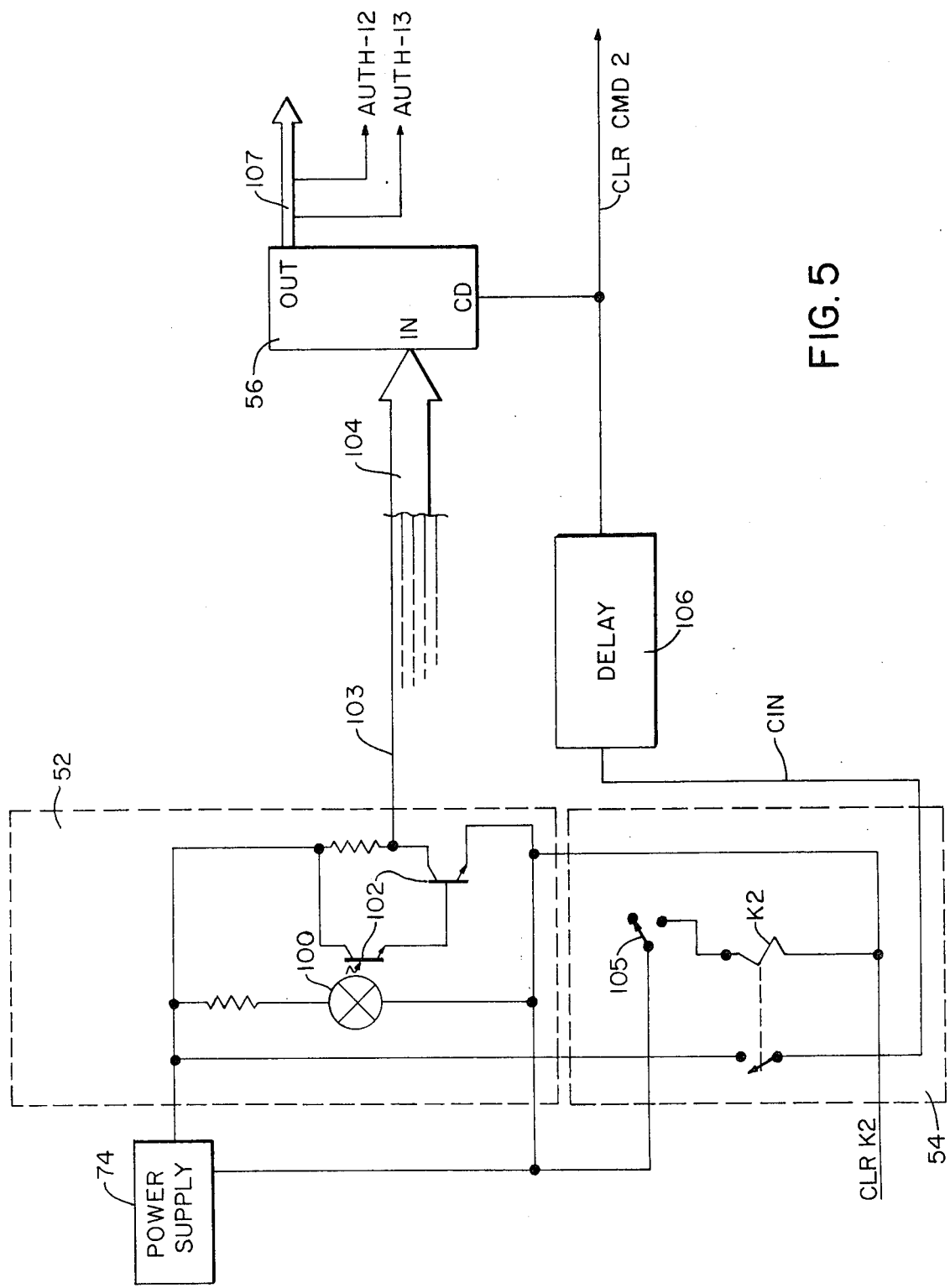
FIG. 5 is a detailed schematic of a card reader, shift register and card test unit shown in FIG. 4.

FIG. 5 shows further details of the card reader 52, shift register 56, and card test unit 54 of FIG. 4. The card reader 52 shown in FIG. 5 includes a plurality of photosensing card data detectors, e.g. thirteen detectors. One such detector is shown in FIG. 5. It comprises an incandescent lamp or light emitting diode as a light source 100 and a photosensitive Darlington transistor pair 102. As noted above, the card 34 (FIG. 3) is opaque except for an encoded pattern of openings 36. When light from the source 100 impinges on its opposed photo-transistor pair 102, signifying an opening 36 is present in that particular card location, the pair 102 conducts and an output conductor 103 shifts to a ground or common voltage level. Otherwise, the conductor 103 remains at a positive component voltage level, signifying no opening 36 in the card location. There are other conductors for each pair 102 which together form a bus 104 which connects to input terminals of the shift register 56.

The card testing unit 54, also shown in FIG. 5, includes a card test switch 105 which is positioned within the accessory body 22 or 26 (FIGS. 1 and 2). When a card is properly inserted in the slot 32, it closes the switch 105 and energizes a coil for a normally-open relay K2 through the power supply 74. The relay K2 contacts thus close, and couple the power supply voltage as the CIN signal to a delay circuit 106. The output from the delay cicuit 106 shifts to the power supply voltage and loads in the register 56 signals corresponding to the pattern of openings 36 in the card 34 (FIG. 3).

As shown in FIG. 5, the AUTH-12 and -13 signals are taken from corresponding stages in the register 56 and applied as inputs to the user authorization level control unit 60 of FIG. 4. The remaining outputs from the register 56 as coupled to the data multiplexer 82 (FIG. 4) by a bus 107. The CLR CMD 2 signal is taken from the output of the delay circuit 106 and applied to the clear around control unit 62 (FIG. 4).

Line Level Sensor 66 and Dialed Number Detector 68

Figure 6:
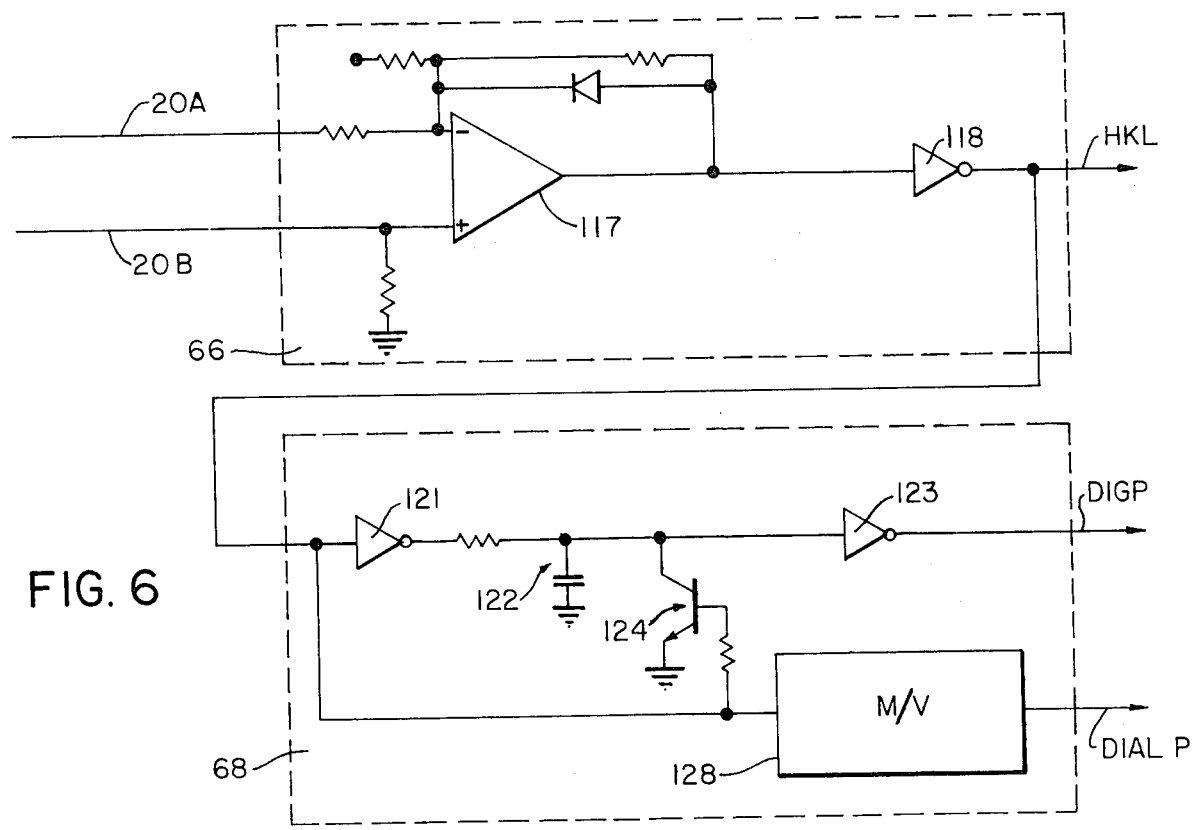
FIG. 6 is a detailed schematic of a line level sensor and dialed number detector shown in FIG. 4.

Referring now to FIG. 6, the line level sensor 66 connects to positive and common leads 20A and 20B at the telephone set 10 or 28 (FIG. 4). As noted above, full voltage appears between the leads 20A and 20B when the receiver 14 (FIG. 1) is on its cradle; otherwise, a zero voltage appears.

A high input impedance operational amplifier circuit 117 in the sensor 66 reduces the line voltage to a level which is compatible with conventional digital components, such as inverter 118. The inverter 118 transmits a ground assertive HKL signal when the receiver 14 is off its cradle.

Still referring to FIG. 6, parallel circuits in the dialed number detector 68 receive the dial pulses on the lines 20A and 20B. In one circuit, a first inverter 121, low-pass filter 122 and second inverter 123 produce a positive assertive DIGP signal as each digit is dialed. When the receiver is on the cradle, the HKL signal turns on a transistor 124 thereby to clamp the DIGP signal at its non-assertive level. After each digit is dialed, the DIGP signal shifts back to the non-assertive level.

The dial pulses are also applied directly to a circuit including a "one-shot" monostable multivibrator 128 within the dialed number detector 68 of FIG. 6. The multivibrator 128 produces an output pulse in response to each positive-going transition (i.e., the leading edge) of the dial pulses. Thus, the multivibrator 128 produces one fixed duration DIALP pulse at its output for each dial pulse, thereby to minimize false counts which might otherwise be produced by line noise.

Dialed Number Counter 76 and Dialed Number Register 78

Figure 7:
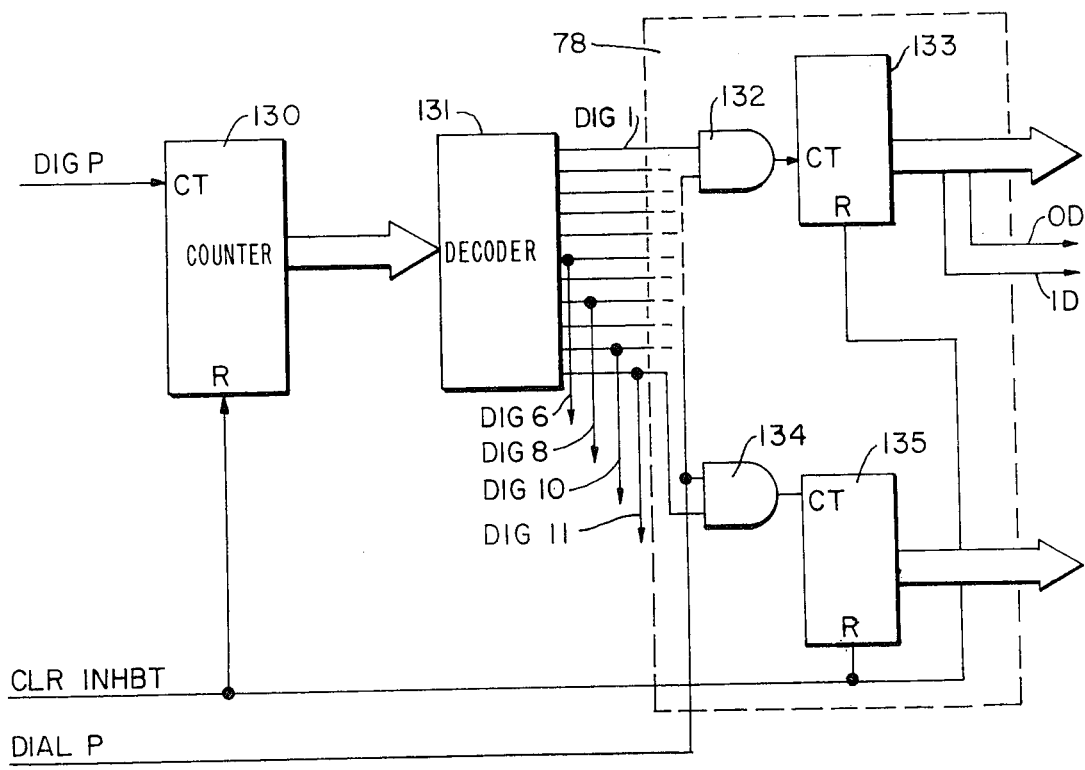
FIG. 7 is a schematic illustrating in more detail a dialed number counter and dialed number register shown in FIG. 4.

The dialed number counter 76 and dialed number register 78 of FIG. 4 are shown interconnected in FIG. 7 of the drawings. Each DIGP signal from the dialed number detector 68 shown in FIG. 6 advances a counter 130. A decoder 131 receives the outputs from the counter 130 to select one of several counters in the dialed number register 78. The first DIGP signal received produces an output signal on a DIG1 line to indicate that a first digit is being dialed. This enables a routing gate 132 to couple the dial pulses (DIALP) corresponding to the first digit to a first counter 133. When the last dial pulse for the first digit is received, the counter 133 records the value of the first digit in binary form. A subsequently received DIGP pulse advances the counter to count the next sequence of DIALP pulses to a next counter. This process continues for each successively dialed digit. If 11 digits are dialed, the counter 130 and decoder 131 produce a DIG11 signal to enable an AND gate 134 so that a counter 135 stores the value of the eleventh dialed digit. In this way, up to 11 digits are individually stored in the register 78.

If 10 dial pulses or one dial pulse are loaded into the counter 133, the OD signal or the 1D signal respectively, is coupled to the user authorization level control unit 60 of FIG. 4. The DIG6, DIG8, DIG10, and DIG11 output signals from the decoder 131 are also coupled to the user authorization level control unit 60. The CLR INHBT signal from the clear control unit 62 of FIG. 4 clears each counter in the register 78 and the counter 130. The outputs from the register 78 connect to the data multiplexer 82 of FIG. 4.

Relay Control Unit 58

Figure 8:
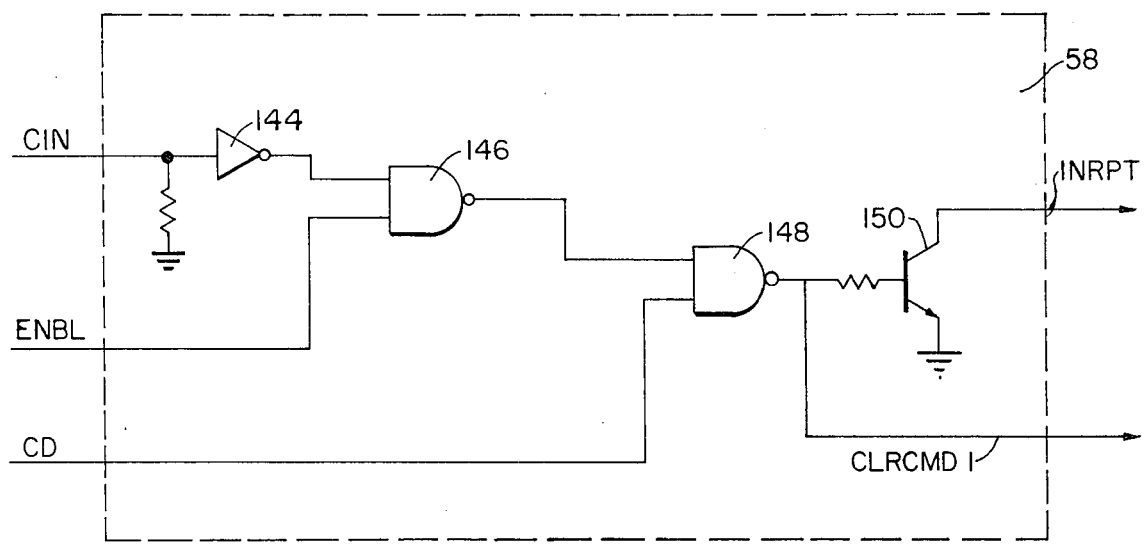
FIG. 8 is a schematic illustrating in more detail a relay control unit shown in FIG. 4.

The relay control unit 58 of FIG. 4 is shown in more detail in FIG. 8. As shown in FIG. 8, an inverter 144 couples the CIN signal for the card test unit 54 to a first NAND gate 146. The ENBL signal from the enabling circuit 64 of FIG. 4 is the other input. The NAND gate 146 thereby enables a second NAND gate 148 except when the CIN signal is non-assertive and the ENBL signal is assertive. If the CIN, ENB and CD signals are all assertive, signifying that the card is present, the receiver is off, and call being placed is authorized, the output of the NAND gate 148 turns off a transistor 150. With these conditions, the INRPT signal from the transistor 150 is non-assertive and deenergizes the coil in the relay K1 so the contacts are closed. Moreover, the CLR CMD 1 signal from the NAND gate 148 is non-assertive.

If CIN signal is non-assertive, while the ENBL and CD signals are both assertive, there is no card, but the receiver is off and a call is being dialed. The transistor 150 turns on, shifting the INRPT signal to an assertive state, thereby opening the contacts of the relay K1 of FIG. 4. This prevents the extension of the call through the telephone line. The CLR CMD 1 signal also shifts to an assertive state. This causes the clear control unit 62 of FIG. 4 to transmit a CLR signal.

Similarly, if the CIN and ENBL signals are assertive while the CD signal is non-assertive, the card is present and the receiver is off, but the user authorization control unit 60 in FIG. 4 disallows the call. Again, the NAND gate 148 transmits the CLR CMD 1 signal and the INRPT signal opens the K1 relay.

Enabling Circuit 64

Figure 9:
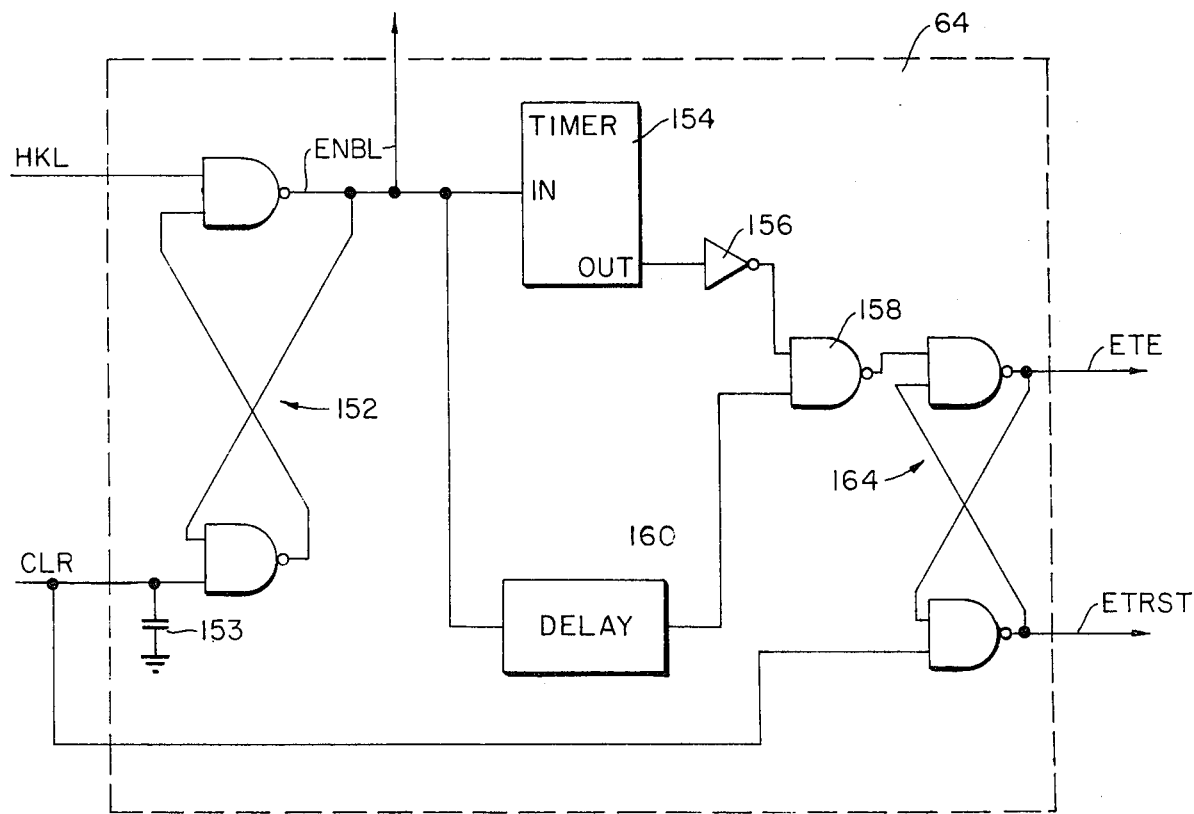
FIG. 9 is a schematic illustrating in more detail an enabling circuit shown in FIG. 4.

FIG. 9 illustrates the enabling circuit 64 of FIG. 4. The HKL signal from the line level sensor 66 and the CLR signal from the clear control unit 62 are applied as inputs to cross-coupled NAND gates which constitute a flip-flop 152. Thus, if the HKL signal is non-assertive, an assertive CLR signal shifts the ENBL signal to a non-assertive state, after a delay determined by a capacitor 153. When the HKL signal becomes assertive, indicating that the receiver is off its cradle, and the CLR signal is non-assertive, the flip-flop 152 sets and asserts the ENBL signal to activate a delay timer 154. The timer 154 illustratively has a delay interval of 15 seconds.

An inverter 156 couples the output from the timer 154 to a first input of a NAND gate 158. The ENBL signal is applied to a second input of the NAND gate 158 through a time delay circuit 160 to avoid a races problem. As a result, the NAND gate 158 keeps a flip-flop 164 reset so the ETE signal is non-assertive, while the ET RST signal is assertive. When the delay interval terminates, the inverter 156 energizes the NAND gate 158, so the flip-flop 164 sets and asserts the ETE signal. The ET RST signal shifts to a non-assertive state. The flip-flop 164 is cleared when the clear control unit 62 of FIG. 4 transmits a CLR signal.

Elapsed Time Counter/Register 72

Figure 10:
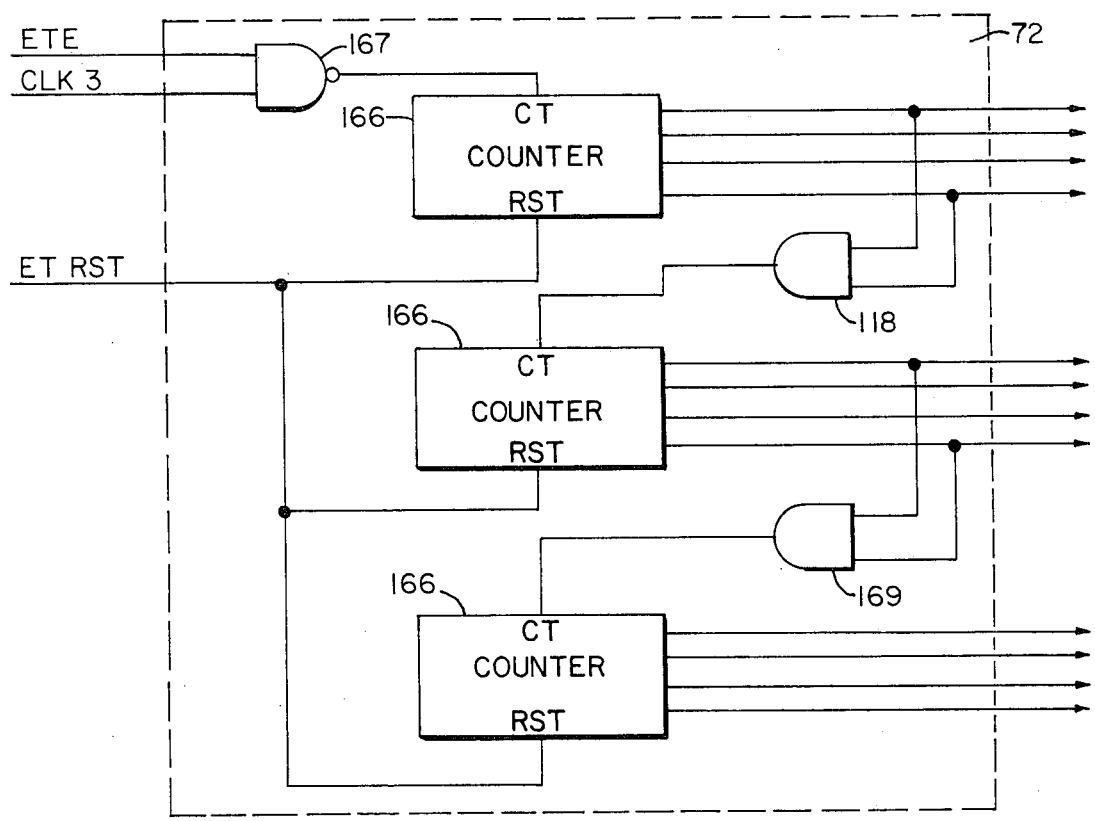
FIG. 10 is a schematic illustrating in more detail an elasped time counter/register shown in FIG. 4.

Now referring to FIG. 10, the elapsed time counter/register 72 includes three tandem decade counters 166 controlled by the ETE and ET RST signals from the enabling circuit 64 shown in FIG. 9. When the ETE signal is assertive and ET RST signal is non-assertive, the counters 166 are enabled to accumulate the CLK 3 pulses from the clocking unit 80 of FIG. 4. Specifically, a NAND gate 167 couples inverted CLK 3 pulses to a counting (CT) input of the first decade counter 166. AND gates 168 and 169 couple the other two decade counters. The elapsed time is thus stored as a binary-coded decimal number corresponding to the number of 15 second intervals in the call. The counters 166 are cleared when the ET RST signal is shifted to an assertive state.

Clear Control Unit 62

Figure 11:
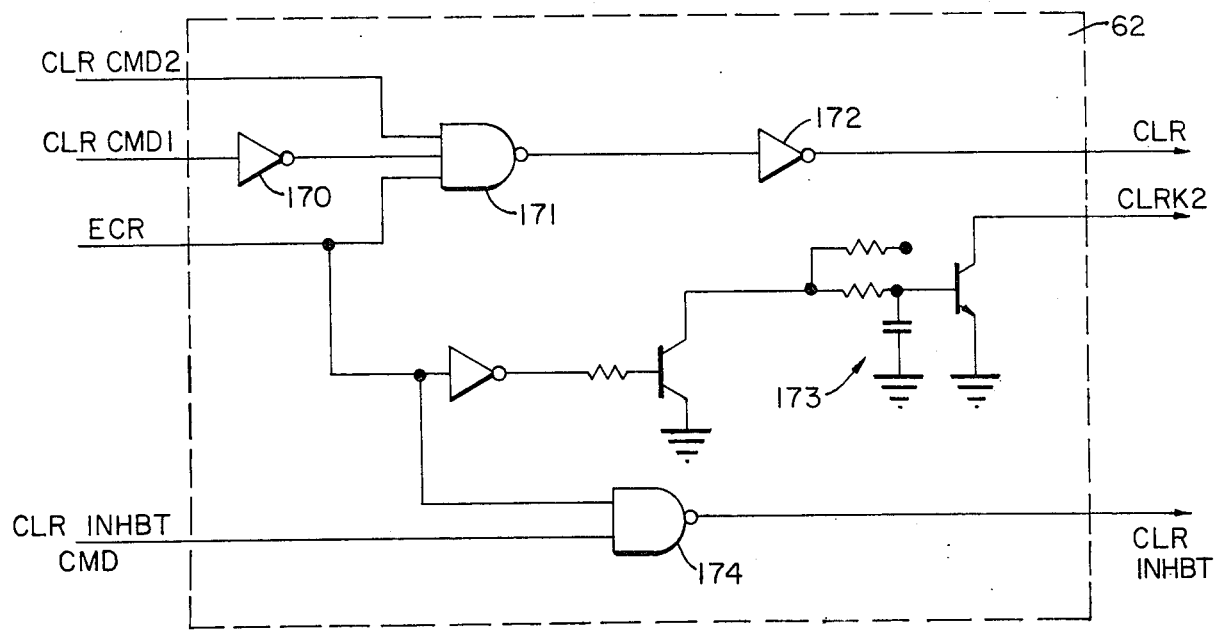
FIG. 11 is a schematic illustrating in more detail a clear control unit shown in FIG. 4.

In FIG. 11, the clear control unit 62 of FIG. 4 receives the CLR CMD 2 signal from the shift register 56 shown in FIG. 5, the CLR CMD 1 signal from the relay control unit 58 shown in FIG. 8, and the EOR signal from the multiplexer control unit 70 of FIG. 4. The CLR CMD 2, CLR CMD 1 and EOR signals are inputs to a NAND gate 171. A CLR INHBT CMD signal from the user authorization level control unit 60 of FIG. 4 and the EOR signal are inputs to another NAND gate 174.

So long as the CLR CMD 2 signal is non-assertive, the CLR CMD 1 signal is non-assertive and the EOR signal is non-assertive, an inverter 170, NAND gate 171 and inverter 172 do not assert a CLR signal.

When any one of the CLR CMD 1, CLR CMD 2 and EOR signals is assertive, a CLR signal is asserted. The CLR signal resets the user authorization level control unit 60 of FIG. 4 and the enabling circuit 64 shown in FIG. 9. The CLR signal also causes the user authorization control unit 60 of FIG. 4 to transmit a CLR INHBT CMD signal. A NAND gate 174 transmits a CLR INHBT signal in response to the CLR INHBT CMD signal from the user authorization level control unit 60 and the EOR signal from the multiplexer control unit 70. The CLR INHBT signal clears the dialed number counter 76 and dialed number register 78 shown in FIG. 7.

A buffered time delay circuit 173 in the clear control unit 62 shown in FIG. 11 transmits a delayed CLR K2 signal in response to the EOR signal. The CLR K2 signal interrupts the relay K2 in the card test unit 54 shown in FIG. 5 and terminates the CIN signal therefrom.

User Authorization Level Control Unit 60

Figure 12:
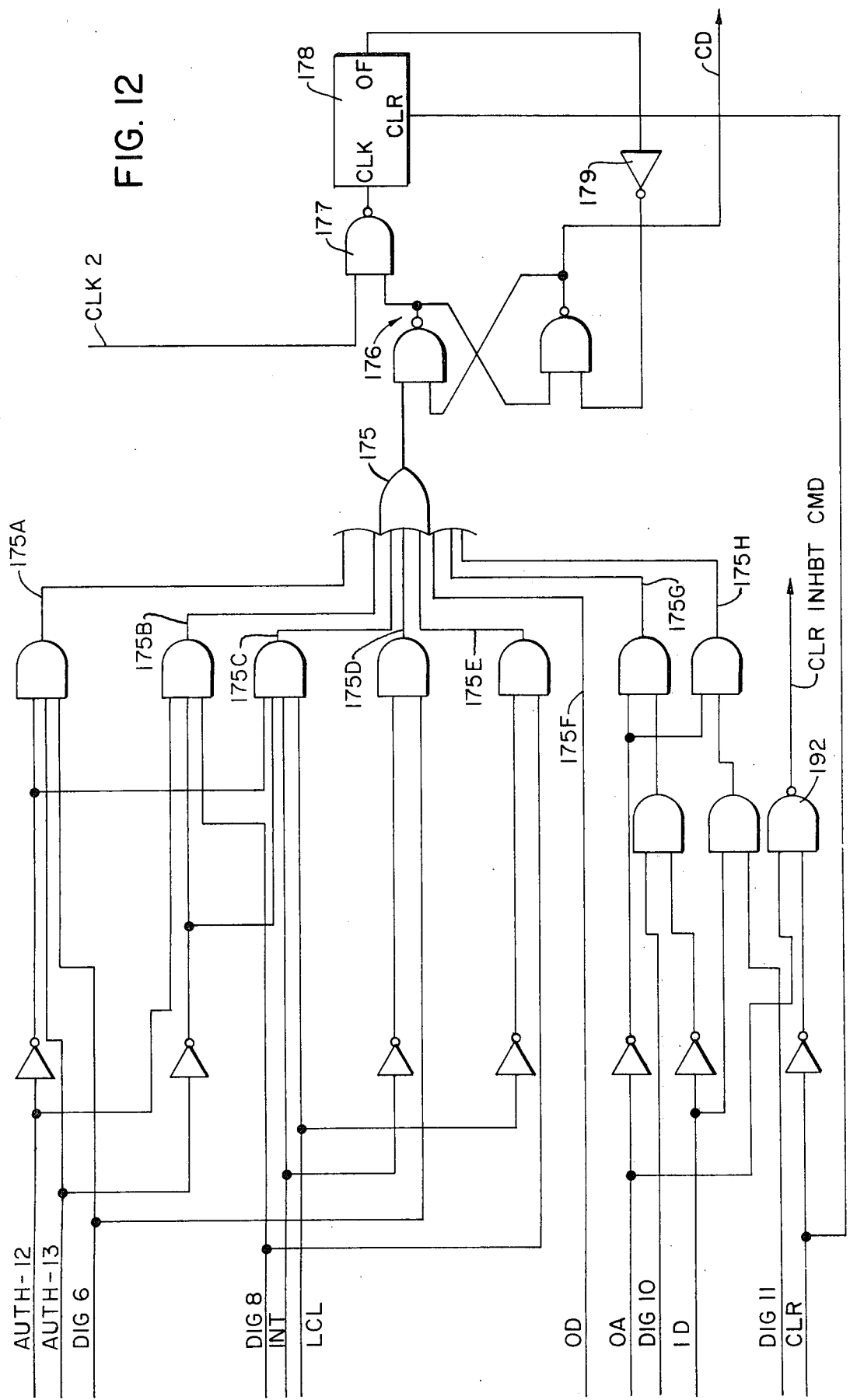
FIG. 12 is a schematic illustrating in more detail a user authorization level control unit shown in FIG. 4.

FIG. 12 illustrates the user authorization level control unit 60 of FIG. 4. As shown in FIG. 12, the controlling input signals to the unit 60 are the AUTH-12 and AUTH-13 signals from the shift register 56 shown in FIG. 5, the DIG6, DIG8, DIG10 and DIG11 signals from the dialed number counter 76 shown in FIG. 7, the 0D and 1D signals from the dialed number register 78 shown in FIG. 7, and the CLR signal from the clear control signal 62 shown in FIG. 11. The input signals INT, LCL, and OA are signals which are transmitted by the optional call enabling unit 200 shown in FIG. 4, which is described in the next section herein.

In FIG. 12, these input signals are applied through an array of logic elements to an OR gate 175. The output signal from the OR gate 175 sets a flip-flop 176 when any one of the input conductors 175A through 175H to the gate 175 represents conditions illustratively as follows:

Conductor 175A: The AUTH-12 and AUTH-13 signals have values of 0 and 1, respectively, indicating that the user is authorized to make intercom calls only and he dials a sixth digit, i.e., DIG6 is assertive.
Conductor 175B: The AUTH-12 and AUTH-13 signals have a values of 1 and 0, respectively, indicating that the user is authorized to make local calls and he dials an eighth digit, i.e., DIG8 is assertive.
Conductor 175C: The AUTH-12 and AUTH-13 signals both have values of 0, indicating that no card is inserted, and the INT and LCL signals are non-assertive; the conditions under which the INT and LCL signals are assertive are explained later in connection with the optional call enabling unit 200.
Conductor 175D: The INT signal is assertive and the user dials a sixth digit, i.e., DIG6 is assertive.
Conductor 175E: The LCL signal is assertive and the user dials an eight digit, i.e., DIG8 is assertive.
Conductor 175F: The user dials a 0 as the first digit in a call, i.e., the OD signal is assertive.
Conductor 175G: The OA signal is assertive and the 1D signal is not assertive and the user dials a tenth digit, i.e., DIG10 is assertive.
Conductor 175H: The OA signal is assertive and the 1D signal is assertive and the user dials an eleventh digit, i.e., DIG11 is assertive.

When the flip-flop 176 sets under any one of the above-specified conditions, it asserts the CD signal (a ground assertive signal). The CD signal is transmitted to the relay control unit 58 shown in FIG. 8, and, as described above, opens the relay K1 to interrupt the telephone lead 20A (FIG. 4), thus preventing extension of the call to or from the telephone set.

When the flip-flop 176 of FIG. 12 sets, it also enables a NAND gate 177 to pass delayed CLK 2 pulses, (e.g., 4 pulses per second) to a counter 178 thereby to define a timing interval (e.g., 2 seconds). When the counter 178 receives the eighth CLK 2 pulse, it transmits an output signal. An inverter 179 couples this output signal back to the flip-flop 176 to reset it. When the flip-flop 176 resets, it disables the NAND gate 177. Moreover, it causes the CD signal to shift to its non-assertive value, so that the relay K1 closes. The shift of the CD signal causes the relay control unit 58 shown in FIG. 8 to transmit the CLR CMD 1 signal to the clear control unit 62 shown in FIG. 11. The clear control unit in turn transmits the CLR signal. The inverter 179 continues to apply an overriding reset signal to the flip-flop 176 until the receipt of the CLR signal which clears the counter 178 and deenergizes the inverter 179. This restores the user authorization control unit 60 to FIG. 12 to its original condition, forcing the user to redial the call.

Multiplexer Control Unit 70 and Multiplexer 82

Figure 13:
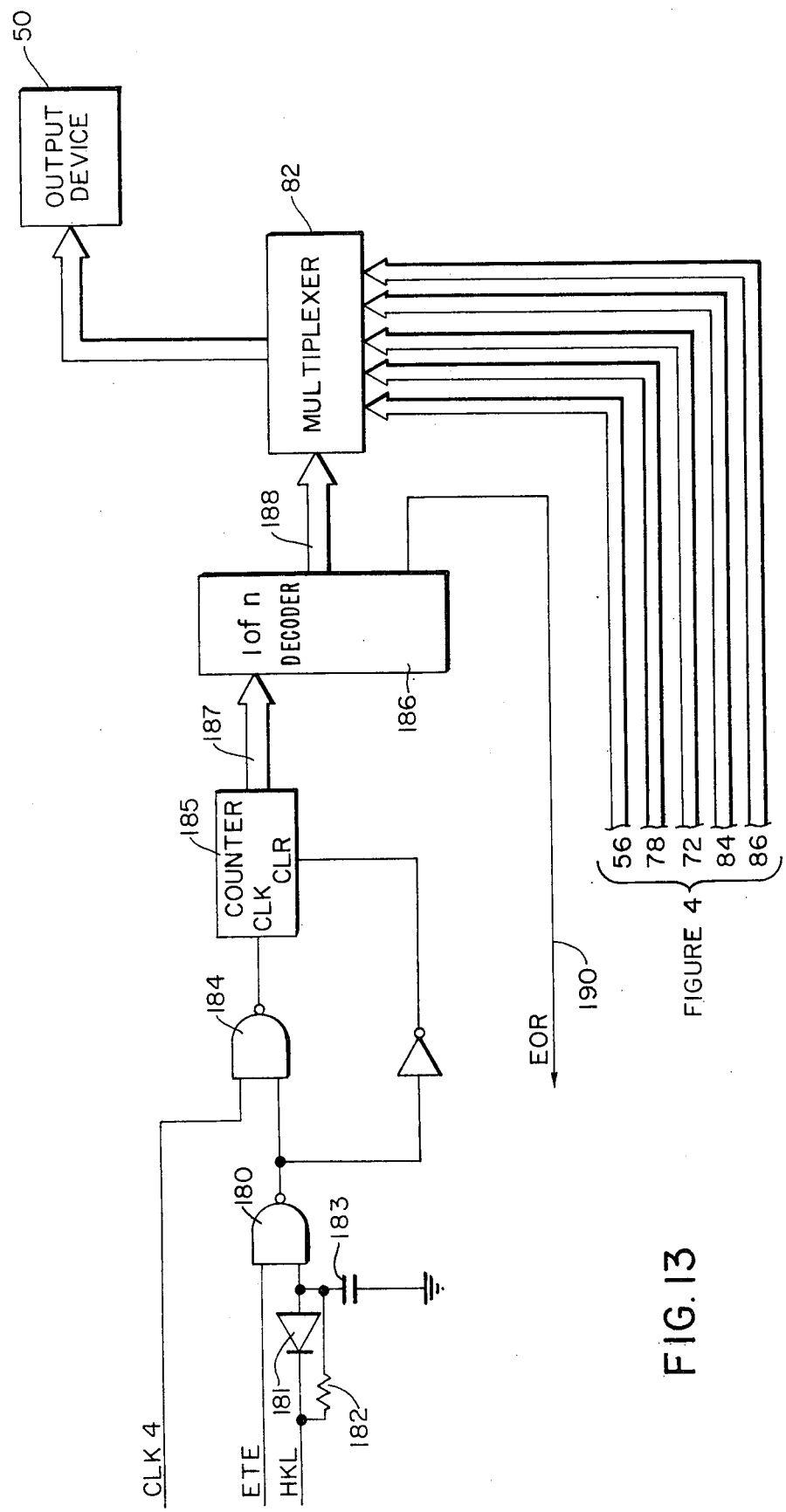
FIG. 13 is a schematic illustrating in more detail a multiplexer control unit and multiplexer shown in FIG. 4.

FIG. 13 illustrates the multiplexer control unit 70 and the multiplexer 82 of FIG. 4. The controlling inputs to the multiplexer control unit 70 are the HKL signal from the line level sensor 66 shown in FIG. 6 and the ETE signal from the enabling circuit 64 shown in FIG. 9. The HKL signal is applied to an AND gate 180 through the time delay circuit comprising a diode 181, a resistor 182 and capacitor 183. This time delay circuit prevents dial pulses from enabling the AND gate 180. When the ETE signal is asserted simultaneously with the HKL signal, the AND gate 110 enables a NAND gate 184 to pass CLK 4 pulses from the clocking unit 80 (FIG. 4) to a counter 185. As the counter 185 receives each CLK 4 pulse, it advances by one count. The count of the counter 185 is reflected in the pattern of signals on output conductors 187. A 1 of *n* decoder 186 responds to the incoming pattern of signals from the counter 185 by energizing a corresponding one of a plurality of output conductors 188. Decoders of this type are well known in the art.

The multiplexer 82 is a conventional device for transferring, in sequence, to the output device 50, signals corresponding to the contents of the registers 56, 78, 72, 84 and 86 of FIG. 4. The outputs of each of the registers 56, 78, 72, 84 and 86 are the inputs to a series of routing gates in the multiplexer 82. As each of the output conductors 188 from the decoder 186 is energized, it enables a different set of the routing gates associated with a different one of the registers. Simultaneously, a load or print command is sent to the output device 50. On successive counts of the counter 185, the data is thus transferred to the device 50.

On the next count after the data from the last register is transferred, the EOR signal is asserted on the output conductor 190 from the decoder 186. The EOR signal is transmitted to the clear control unit 62 shown in FIG. 11. As noted above, upon receiving the EOR signal, the clear control unit 62 asserts a CLR signal, and the enabling circuit 64 shown in FIG. 9 shifts the ETE signal to its non-assertive state. The gate 184 in the multiplexer control unit 70 of FIG. 13 is disabled, and the counter 185 therein is cleared. The unit 70 is thus restored to its initial condition.

Optional Call Enabling Unit

Figure 14A:
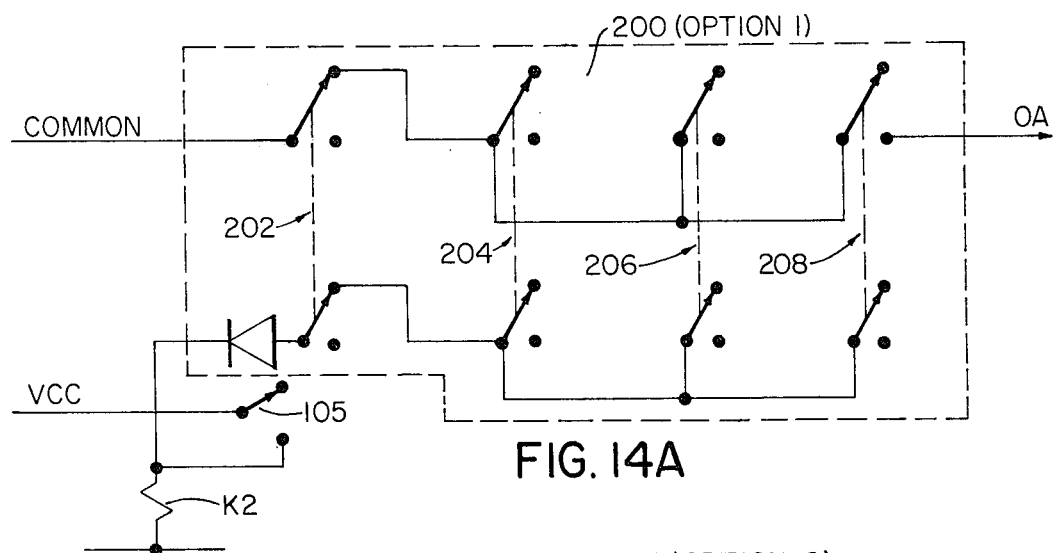
FIGS. 14A, 14B, and 14C are schematics illustrating three different call controlling configurations of an optional call enabling unit for use with the system shown in FIG. 4.
Figure 14B:
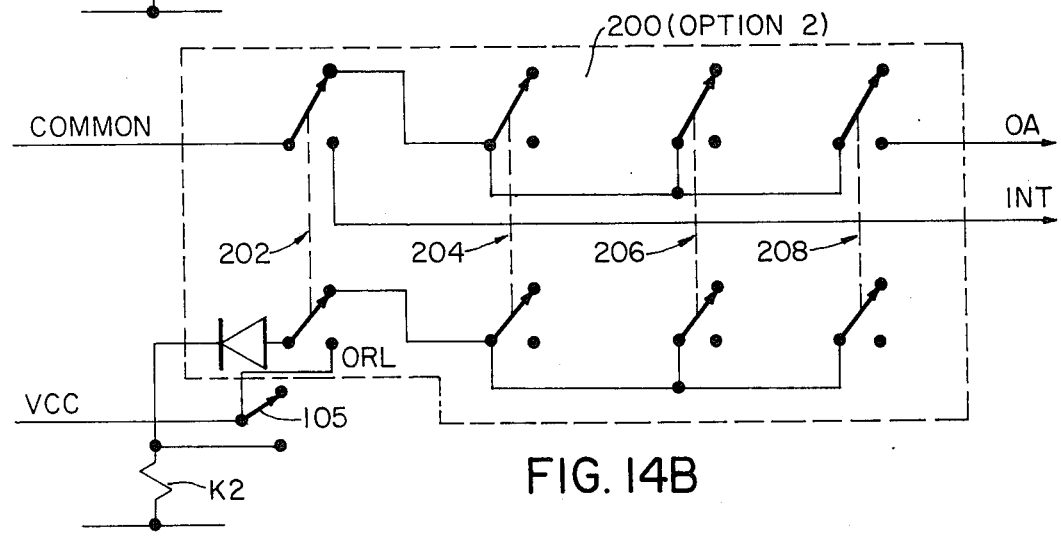
Figure 14C:
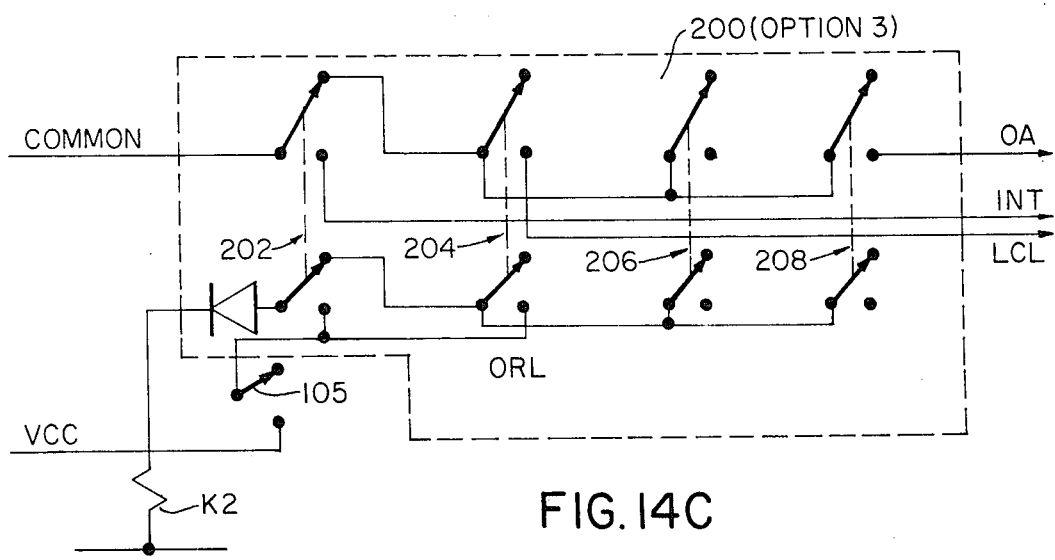

FIGS. 14A, 14B and 14C illustrate various call controlling configurations of the optional call enabling unit 200 shown in FIG. 4. The unit 200 provides the subscriber with the option of allowing certain calls to be placed without the use of the card 34 (FIG. 3). The unit 200 also provides the means for allowing authorized users to make operator-assisted long distance calls. The call enabling unit 200 connects directly to the card test unit 54 shown in FIG. 5 and, depending upon the option selected, transmits one or more of the control signals INT, LCL and OA to the user authorization level control unit 60 shown in FIG. 12.

As indicated in FIG. 14A, 14B, and 14C, the call enabling unit 200 includes four ganged switch pairs 202, 204, 206, and 208. These switches are activated by depressing the four, externally mounted accessory body keys 40, 42, 44, and 46 shown in FIGS. 1 and 2 of the drawings. The switches 202 through 208 and corresponding keys 40 through 46 are associated with intercom calls, local calls, direct-dialed long distance calls, and operator-assisted long distance calls, respectively, and are preferrably identified at the telephone set as such. The keys 40 through 46 are illustratively similar to the line selection keys in a conventional key telephone set. Depressing any one of the keys 40 through 46 and thus closing any one of the switches 202 through 208, respectively, has the effect of opening the others. Consequently, only one of the keys 40 through 46 can be depressed at a given time.

A number of optional call configurations are available with the unit 200. These configurations are determined by the manner in which the switches 202 through 208 are wired, and are decribed in sequence below.

Option 1 — Card Required for All Calls

FIG. 14A illustrates the configuration of the call enabling unit 200 in which a card is required to make all calls. As shown in FIG. 14A, the stationary contacts of the switches 204 through 208 are wired together and connected to the open (upper) contact of the switch 202. In this option, no INT or LCL control signals are generated by the unit 200 even though the user depresses one of the keys 40, 42 or 44. Consequently, a card is required to make intercom, local and long distance calls. However, a user whose card indicates that he is authorized to make long distance calls can make operator-assisted long distance calls by depressing the operator-assist key 46 and closing the switch 208. This connects to an OA terminal (lower contact of the switch 208) to common of the power supply unit 74 of FIG. 4. The OA signal is thus asserted and applied as a controlling input to the user authorization level control unit 60 shown in FIG. 12. It is noted that, if any of the keys 40, 42 or 44 is subsequently depressed, the OA terminal is shifted back to its non-assertive state.

Referring again to the user authorization control unit 60 shown in FIG. 12, it can now be seen how this option allows operator-assisted calls to be placed by an authorized user. It is assumed that the user inserted his card, and depressed the operator-assist key 46 (FIGS 1 and 2), depressing the switch 208, and asserting the OA signal. It is also assumed that AUTH-12 and AUTH-13 both have a value of 1, indicating that the user is authorized to make long distance calls. Conductor 175F will enable the gate 175 to set the flip-flop 176 if a 0 is dialed as the first digit in the call, i.e., the 0D signal will be asserted. To complete an operator-assisted call, the system requires that the user first enter the ten digits of the call desired before the operator can be reached. This insures that the called number is stored in the system. Conductor 175G will enable the gate 175 in FIG. 12 when the DIG10 and OA signals are both asserted. This signifies that the user has entered ten digits in a desired call before dialing 0. The 10 digits are stored in the usual manner in the dialed number register 78 shown in FIG. 7.

Immediately after dialing the 10 digits, the flip-flop 176 is set and the call is interrupted. However, when the OA signal is asserted, a CLR INHBT CMD signal from a NAND gate 192 in FIG. 12 is also asserted. This prevents the clear control unit 62 shown in FIG. 11 from clearing the number stored in the dialed number register 78 even though the call has been interrupted via the conductor 175G to the gate 175 (FIG. 12). In this way, the user can dial 0 after the 2 second interruption determined by the user authorization control unit 60 of FIG. 12, and reach the operator. Since the dialed number register 78 is not cleared, the dialed 0 is not stored.

If, in attempting to make an operator assisted call, the user fails to depress the operator-assist key 46, the OA signal is not asserted. The CLR INHBT CMD signal is thus not asserted. After dialing 10 digits, conductor 175G will enable the gate 175 in FIG. 12, and the call will be interrupted. The clear control unit 62 will in this event clear the dialed number register 78, and reset the enabling circuit 64. The user is consequently required to dial again. The operator-assisted call will be allowed only if the key 46 is depressed.

It will also be noted from FIG. 12 that a direct-dialed long distance call cannot be made with the operator-assist key 46 depressed. Specifically, if the 1D signal is asserted (signifying a 1 is dialed as the first digit) and the OA signal is asserted (signifying key 46 is depressed), the conductor 175H will enable the gate 175 of FIG. 12 to interrupt the call after 11 digits are dialed. The OA signal can be made non-assertive by depressing the direct-dial key 44 (FIGS. 1 and 2). This would allow a user whose card represents that he is authorized make a long distance call to dial a long distance call directly with a 1 as the first digit.

Option 2 — Intercom Calls Allowed with No Card

FIG. 14B illustrates the configuration of the call enabling unit 200 in which no card is required to place intercom calls. In this option, a card test override control line (ORL) connects the closed (lower) contact of the switch 202 to the stationary contact of the card test switch 105 in the card test unit 54 shown in FIG. 5. By depressing the intercom key 40 (FIGS. 1 and 2) and closing the switch 202, the relay K2 in the card test unit 54 is energized. The switch 105 is thus bypassed, and the CIN signal is asserted, even though no card has been inserted. In addition, the switch 202, when closed, asserts the INT signal. The INT signal is transmitted to the user authorization level control unit 60 of FIG. 12 to inform that unit that no card is required for intercom calls.

Referring again to FIG. 12, it can be seen how this option allows intercom calls to be made without a card. With the intercom key 40 (FIGS. 1 and 2) depressed, the INT signal is asserted, and calls of up to six digits will be allowed by the user authorization level control unit 60 with no card. Conductor 175D will enable the gate 175 (call will be interrupted) if AUTH-12 and AUTH-13 both have values of 0 (thus no card in), and the INT and DIG6 signals are both asserted. These conditions interrupt the call because the user has dialed 6 digits without a card. Conductor 175C will enable the gate 175 (call will be interrupted), when AUTH-12 and AUTH-13 both have values of 0 (no card in), and the INT and LCL signals are both non-assertive. Thus, even if the option is selected, intercom calls cannot be placed without a card, if the intercom key 40 is not depressed.

Option 3 — Intercom and Local Calls Allowed with No Card

FIG. 14C illustrates the configuration of the call enabling unit 200 in which no card is required for both intercom and local calls. In this option, the ORL control line is supplied when either the switch 202 or the switch 204 is closed, thus overriding the card switch 104 and asserting the CIN signal without a card. In addition, the switch 204 asserts the LCL signal. The LCL signal is transmitted with the INT signal to the user authorization level control unit 60 of FIG. 12 to inform that unit that both local and intercom calls are allowed without a card.

Referring again to FIG. 12, it can be seen that, with the LCL signal asserted, calls of up to 8 digits will be allowed by the unit 60. Conductor 175E will enable the gate 175 (call will be interrupted), when the DIG8 signal is asserted. These conditions signify that the user has dialed eight digits without a card.

SUMMARY

In summary, therefore, I have described a telephone control system which possesses a number of advantages over prior systems. Unlike prior systems, my control system permits a telephone subscriber to exercise control over the types of calls made by each user. A call is disallowed unless the intended user is specifically authorized to place a call of the attempted level by the subscriber. Each permitted call and individual user is clearly and completely identified, allowing the subscriber continuously to monitor telephone usage and to eliminate unnecessary or unauthorized calls whenever possible.

Additionally, my control system provides the subscriber with a wide variety of options. Thus, the system can be adapted readily to meet the subscriber's particular needs. A subscriber may, for example, provide each user with a level of use authorization commensurate with the user's responsibility. If desired, various levels of calling can be allowed without the use of a card. Costly operator-assisted calls may be eliminated completely. A subscriber may also choose the specific data collected concerning each permitted call, including user identification, telephone extension identification, dialed number, time and day of call, and elapsed time of call. Control of incoming calls can be similarly achieved in accordance with the wishes of the subscriber.

As should be apparent, the foregoing discussion describes only specific illustrative embodiments of the invention. They can be modified in many ways by those skilled in the art. For example, other types of user identification devices and user identification device readers are known in the art, and may be substituted for the optically read card 34 and the optical card reader 52. Magnetically or resistively encoded cards may be used with card readers designed therefor. Also, the user identification device may comprise a card or key including openings or grooves which identify the user and his call authorization level. Such a card or key could be read mechanically.

Additionally, various of the circuit components shown in FIG. 4 may be moved out of the accessory bodies 22 and 26 located at a central location on the subscriber's premises. Also, the dialed number detector 68 shown in FIG. 7 can be readily modified so that it detects not only the dial pulses developed by rotary dial telephone sets, such as those shown in FIGS. 1 and 2, but also the multifrequency tone signals developed by pushbutton dial sets. Accordingly, all forms of the word "dial" used in the specification and the following claims are intended to include both rotary and pushbutton type dials. It is, therefore, the object of the appended claims to cover all such variations and modifications as come within the true spirit and scope of this invention.

What I claim as new and desire to secure by Letters Patent of the United States is:

1. Apparatus for controlling the level of calling permitted through a telephone facility according to the authorization level of the particular user of the facility, the facility being of the type including at least one telephone set to be controlled and at least one telephone line capable of transmitting calls of varying levels to and from the telephone set, the telephone set being adapted for use by at least one user, said user being assigned a call authorization code that identifies the user and that represents the level of calling permitted for the user over the telephone line, said apparatus comprising:
  A. means associated with each telephone set to be controlled for generating signals representing the call authorization code of the user;
  B. means associated with each telephone set to be controlled for generating signals representing the level of a call to be extended through the telephone set by the user;
  C. means for switchably connecting the telephone set to the telephone line; and
  D. control means including i. means responsive to the user authorization code signals for establishing a predetermined maximum level of authorized telephone use for the user, and ii. means responsive to the call level signals for activating said switchable means to disconnect the telephone set from the telephone line when the call to be extended by the user exceeds the user's predetermined maximum level.

2. Apparatus as recited in claim 1 in which the telephone set includes means for dialing a telephone number comprising a sequence of digits, in which said call level signal generating means comprises means for generating signals representing the number of digits in a dialed telephone number and in which said control means includes:

i. means responsive to the user authorization code signals for establishing a predetermined authorized maximum number of dialed digits for the user based upon the user authorization code signals, and ii. means responsive to the number of dialed digits signals for activating said switchable means to disconnect the telephone set from the telephone line when the number of dialed digits exceeds said predetermined authorized maximum number of digits for the user.

3. Apparatus as recited in claim 1 in which the telephone set includes means for dialing a telephone number comprising a sequence of digits, in which said call level signal generating means comprises means for generating signals representing the value of the first digit in a dialed telephone number, and in which said control means includes means responsive to the first dialed digit value signals for activating said switchable means to disconnect the telephone set from the telephone line when the first digit in the dialed telephone number has a value of 0.

4. Apparatus as recited in claim 1 in which said user authorization code signal generating means includes:

i. a user identification device for identifying the user and user's call authorization code according to data encoded in said user identification device, and ii. means adapted to receive said user identification device for reading the data encoded therein and for generating the signals representing the user's call authorization code.

5. Apparatus as recited in claim 4 in which said control means further includes means for activating said switchable means to disconnect the telephone set from the telephone line which said user identification device is not received in said reading means.

6. Apparatus as recited in claim 4 in which each user has one of said user identification devices.

7. Apparatus as recited in claim 4 further including means for storing the data read by said reading means from said user identification device for each call permitted by said control means.

8. Apparatus as recited in claim 2 further including means for generating signals representing the value of the digits in the dialed telephone number and for storing the dialed digit value signals for each call permitted by said control means.

9. Apparatus as recited in claim 1 further including:

E. a clocking means for generating signals representing day of year and time of day; and F. means coupled to said clocking means for storing the day of year and time of day signals for each call permitted by said control means.

10. Apparatus as recited in claim 1 further including:

E. a clocking means for emitting pulses spaced by a predetermined time interval;

F. means coupled to said clocking means for counting the pulses emitted thereby, said counting means being enabled upon the start of each call permitted by said control means and disabled upon the termination of each permitted call; and G. means coupled to said counting means for detecting and storing the number of pulses counted by said counting means, said number representing the elapsed time of each permitted call.

11. Apparatus as recited in claim 1 in which each telephone set to be controlled has an identification code, said apparatus further including means for generating and storing signals representing the identification code of the telephone set being used for each permitted call.

12. Apparatus as recited in claim 4 in which said reading means is contained in an accessory body and in which said user identification device comprises an encoded card which is manually insertable in a slot provided in said accessory body.

13. Apparatus as recited in claim 12 in which said accessory body is constructed for detachable engagement with the telephone set.

14. Apparatus as recited in claim 12 in which said accessory body is formed as a structurally integral part of telephone set.

15. Apparatus as recited in claim 12 in which said reading means includes an energy source, a card test switch for activating said energy source, said switch being located in said accessory body in a position to be contacted by said encoded card when inserted in said accessory body, said energy source being supported in said accessory body in a position to radiate energy through selectively located energy transmitting portions of said encoded card when inserted in said accessory body, and energy sensing means positioned to receive the energy selectively transmitted through said encoded card and to generate signals representing the user identification and authorization level data encoded in said card.

16. Apparatus as recited in claim 15 in which said energy source comprises a plurality of light sources supported in said accessory body in positions to radiate light through selectively located light transmitting portions of said encoded card, and in which said energy sensing means comprises a plurality of light sensitive elements positioned to receive the light selectively transmitted through said card.

17. Apparatus as recited in claim 1 in which said switchable means comprises a normally closed relay connected in series with the telephone line, said relay being opened to disconnect the telephone set from the telephone line when activated by said control means.

18. Apparatus as recited in claim 1 further including call enabling means for overriding said control means to permit extension of predetermined levels of calls through the telephone set independently of the user authorization code signals.

19. Apparatus as recited in claim 12 further including call enabling means for overriding said control means to permit extension of predetermined levels of calls through the telephone set independently of the insertion of said encoded card in said accessory body.

20. Apparatus as recited in claim 19 in which said call enabling means includes a first manually depressible switch mounted externally to said accessory body for permitting extension of calls of up to 6 digits independently of the insertion of said encoded card in said accessory body.

21. Apparatus as recited in claim 20 in which call enabling means includes a second manually depressible switch mounted externally of said accessory body for permitting extension of calls of up to 7 digits independently of the insertion of said encoded card in said accessory body.

22. Apparatus as recited in claim 3 further including call enabling means for overriding said control means to permit extension of a call to a dialed telephone number when the first digit in the dialed telephone number has a value of 0 provided the user call authorization code signals represent that the user is authorized to dial operator-assisted calls.

23. Apparatus for controlling the level of calling permitted through a telephone facility according to the authorization level of the particular user of the facility, the facility being of the type including a plurality of telephone sets and a telephone line associated with each telephone set capable of transmitting calls of varying levels to and from each telephone set, the telephone sets being adapted for use by a plurality of users, each user being assigned a call authorization code that identifies the user and that represents the level of calling permitted for the user over the telephone lines, at least some of said users having different call authorization levels, said apparatus comprising:
  A. a user identification device encoded with data representing the call authorization code of a user;
  B. a user identification device reading means associated with each telephone set to be controlled for reading said user identification device and for generating signals representing the authorization code data of the user using the telephone set;
  C. means associated with each telephone set to be controlled for generating signals representing the leve of a call to be extended through the telephone set by the user;
  D. means for switchably connecting the telephone set to its associated telephone line;
  E. control means including
    i. means responsive to said user authorization code data signals for establishing a predetermined maximum level of authorized telephone use for the user, and
    ii. means responsive to the call level signals for activating said switchable means to disconnect the telephone set from its associated telephone line when the call to be extended by the user exceeds the user's predetermined maximum level;
  F. means for storing said user authorization code data signals and said call level signals for each call permitted by said control means; and
  G. means operative substantially upon completion of each permitted call for restoring said reading means, said switchable means, said control means, and said storing means to condition for controlling subsequent calls.

24. Apparatus as recited in claim 23 in which each telephone set to be controlled includes means for dialing a telephone number comprising a sequence of digits in which said call level signal generating means, comprises means for generating signals representing the value of the digits in a dialed telephone number said storing means being adapted to store said dialed digit value signals.

25. Apparatus as recited in claim 23 in which said reading means is contained in an accessory body constructed for detachable engagement with the telephone set to be controlled, and in which said user identification device comprises an encoded card which is manually insertable in a slot provided in said accessory body.

26. Apparatus as recited in claim 25 in which each user has one of said encoded cards.

27. A method of controlling the level of calling permitted through a telephone facility according to the authorization of the particular user of the facility, the facility being of the type including at least one telephone set adapted for use by at least one user, at least one telephone line capable of transmitting calls of varying levels to and from the telephone set, and means for switchably connecting the telephone set to the telephone line, each user being assigned a call authorization code that identifies the user and that represents the level of calling permitted for the user over the telephone line, said method comprising the steps of:
  A. generating signals representing the call authorization code of the user of the telephone set;
  B. generating signals representing the level of a call to be extended through the telephone set by the user;
  C. establishing a predetermined maximum level of authorized telephone use for the user based upon said user authorization code signals; and
  D. actuating said switchable means in response to said call level signals to disconnect the telephone set from the telephone line when the call to be extended by the user exceeds the user's predetermined maximum level.

28. A method as recited in claim 27 in which the telephone set includes means for dialing a telephone number comprising a sequence of digits, in which said call level signal generating step includes the step of generating signals representing the digits in a dialed telephone number, in which said establishing step comprises the steps of establishing a predetermined unauthorized first dialed digit value and establising a predetermined maximum number of authorized digits based upon said user authorization code signals, and in which said activating step comprises the step of activating said switchable means when the first dialed digit in the dialed telephone number has a value equal to that of said predetermined unauthorized first dialed digit value, and when the number of dialed digits exceeds said predetermined maximum number of authorized digits.

29. A method as recited in claim 28 further including the step of storing said user authorization code signals and said dialed digit signals for each call extending through the telephone set.

* * * * *